United States Patent [19]

Chang

[11] Patent Number: 4,730,309

[45] Date of Patent: Mar. 8, 1988

[54] DATA TRANSMISSION STATION

[75] Inventor: Paul S. Chang, Harrisburg, Pa.

[73] Assignee: AMP Incorporated, Harrisburg, Pa.

[21] Appl. No.: 899,681

[22] Filed: Aug. 25, 1986

[51] Int. Cl.⁴ .............................................. H04J 3/02
[52] U.S. Cl. ........................................ 370/86; 370/89
[58] Field of Search ....................... 370/86, 89, 90, 85,
370/96, 95; 340/825.5, 825.51, 825.05

[56]  References Cited

U.S. PATENT DOCUMENTS

| | | | |
|---|---|---|---|
| 4,495,617 | 1/1985 | Ampulski et al. | 370/89 |
| 4,536,873 | 8/1985 | Leete | 370/86 |
| 4,539,678 | 9/1985 | Ambroise et al. | 370/86 |
| 4,675,671 | 6/1987 | Ishizuka et al. | 370/86 |

Primary Examiner—Douglas W. Olms
Attorney, Agent, or Firm—Bruce J. Wolstoncroft

[57]   ABSTRACT

A remote station for use in a data transmission system that includes a clock channel adapted to carry a periodic clock signal, a flag channel adapted to carry a flag signal, and a data channel adapted to carry a plurality of data signals between the remote station and at least one additional station is disclosed. The remote station includes a number of data terminals and circuitry for receiving the clock signal and the flag signal. The flag signal is stored in the remote station for only a selected interval comprising a selected number of periods of the clock signal. The remote station also includes circuitry for gating a number of data signals between the data channel and the data terminals during the selected period when the flag signal is stored in the remote station. At the termination of the selected interval, the flag signal is placed back on the flag channel.

26 Claims, 9 Drawing Figures

FIG. 5 ns which incorporates a presently preferred embodiment of the remote station of this invention.
DATA TRANSMISSION STATION

BACKGROUND OF THE INVENTION

The present invention relates to a data transmission station of the type suited for use in data transmission systems which include a unidirectional bus arranged in a ring topology.

A variety of data transmission systems have in the past used buses arranged in a ring topology. Ambriose, U.S. Pat. No. 4,539,678, Champlin, U.S. Pat. No. 4,561,088, and Blahut, U.S. Pat. No. 3,781,478, provide three examples of such data transmission systems. In the Blahut system, a negative going framing pulse 200 (FIG. 2) is used for timing purposes and is passed from terminal to terminal. Similarly, the Champlin device utilizes a framing pulse 29 to synchronize the respective terminals.

The present invention is directed to an improved data transmission station which is extremely simple to implement and is readily adaptable to data transmission systems which extend over considerable distances.

SUMMARY OF THE INVENTION

According to this invention, a data transmission station for use in a data transmission system that comprises a clock channel adapted to carry a periodic clock signal, a flag channel adapted to carry a flag signal, and a data channel adapted to carry a plurality of data signals between the data transmission station and at least one additional station is provided. This data transmission station includes a plurality of data terminals; means; responsive to the clock channel, for receiving the flag signal. Means are provided for storing the flag signal for only a selected interval comprising a first predetermined number of clock signal periods. In addition, means are provided for gating a plurality of data signals between the data channel and the data terminals during a gating interval which starts a second predetermined number of clock signal periods after the flag signal is received by the flag signal receiving means and lasts for a third predetermined number of clock signal periods. Means are also provided for placing the flag signal on the flag channel after the selected interval. Preferably, the first and third predetermined number of clock signal periods are equal and the second predetermined number of clock signal periods is equal to 0 such that the gating means is operative only when the flag signal is stored in the storing means.

As will become apparent from the detailed description which follows, this invention allows an extremely simple circuit to be used for the data transmission station. Because each station stores the flag signal during the period when the station is interacting with the data channel, the flag signal is progressively retarded with respect to the data signals as the flag signal moves from station to station. In this way, successive stations can be easily and simply enabled at the appropriate time, without the complexity of separate addresses for separate stations. Furthermore, the embodiment below is well-suited for data transmission systems having long spans where propagation delays are significant with respect to the period of the clock signal.

The invention, itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
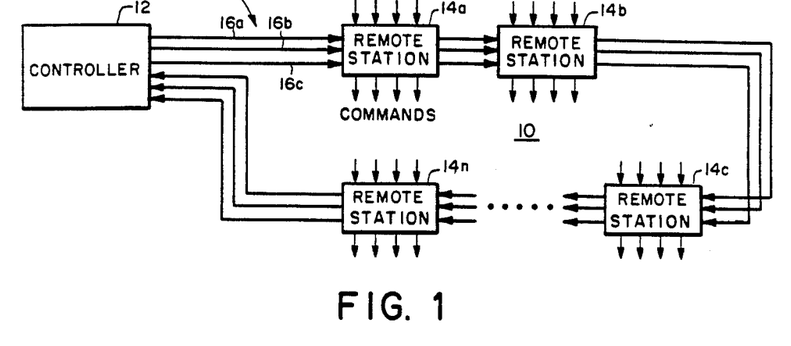
FIG. 1 is a schematic diagram of a data transmission system which incorporates a presently preferred embodiment of the remote station of this invention.

Turning now to the drawings, FIG. 1 shows a data transmission system 10 which includes a controller 12 and a plurality of remote data transmission stations 14a, 14b, 14c, . . . 14n. A three-conductor cable 16 is connected between the controller 12 and the first remote station 14a, between adjacent remote stations, and between the last remote station 14n and the controller 12. Thus, the remote stations 14a–14n and the controller 12 are arranged in a ring topology. Each section of the cable 16 includes three conductors: a flag conductor 16a, a data conductor 16b, and a clock conductor 16c.

Figure 2:
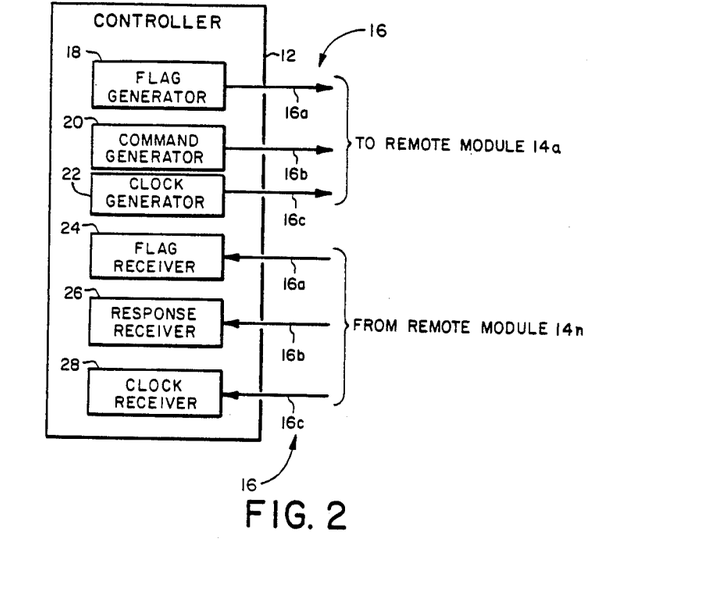
FIG. 2 is a schematic diagram of the controller of FIG. 1.

As shown in FIG. 2, the controller 12 includes a flag generator 18 which generates a flag signal on the flag conductor 16a at the beginning of a communication period, a command generator 20 that generates a plurality of command signals on the data conductor 16b during the communication period, and a clock generator 22 which generates a periodic clock signal on the clock conductor 16c. The signals on the conductors 16a, 16b, 16c will be described in greater detail in conjunction with FIGS. 4a–4e after the structure of the remote stations 14 has been described in connection with FIG. 3. The controller 12 also includes a flag receiver 24 connected to the flag conductor 16a to receive the flag signal from the last remote station 14n, a response receiver 26 which receives and stores response signals from the remote stations 14a–14n, and a clock receiver which monitors the clock signal on the clock conductor 16c as generated by the remote station 14n. The term "data signal" will be used herein to encompass both command signals from the command generator 20 and response signals from the remote stations 14a–14n.

Figure 3:
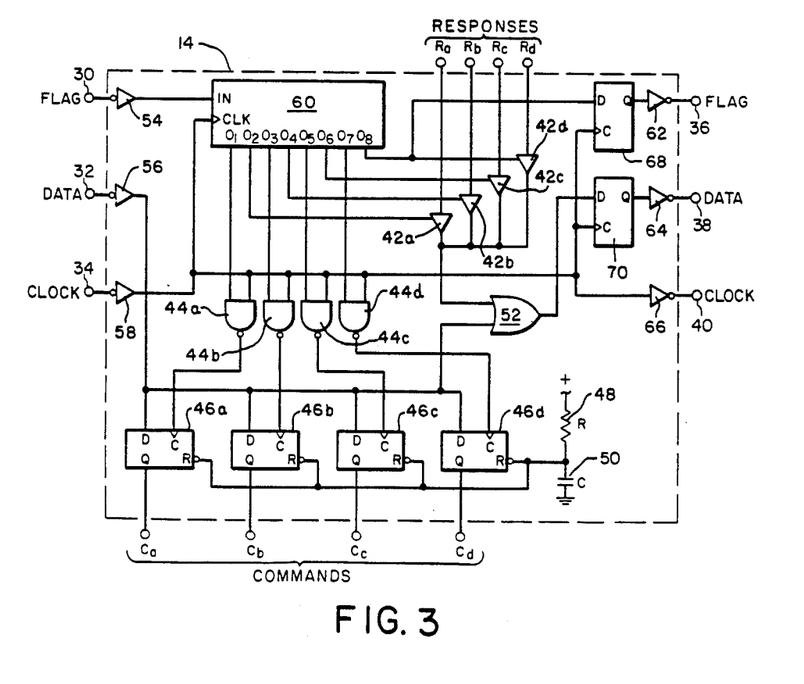
FIG. 3 is a schematic diagram of one of the remote stations of FIG. 1.

FIG. 3 shows a block diagram of one of the remote stations 14. This remote station 14 includes an incoming flag signal terminal 30, an incoming data signal terminal 32, and an incoming clock signal terminal 34 which are connected to the conductors 16a, 16b, 16c, respectively. The remote station 14 also includes an outgoing flag signal terminal 36, an outgoing data signal terminal 38, and an outgoing clock signal terminal 40, which are connected to the conductors 16a, 16b, 16c, respectively. Each station additionally includes four response terminals $R_a, R_b, R_c, R_d$, each of which is adapted to receive a response signal for transmission to the controller 12. Finally, each of the remote stations 14 includes four command terminals $C_a, C_b, C_c, C_d$, each adapted to transmit commands received from the controller 12 to a device being controlled by the controller 12.

The four response terminals $R_a$–$R_d$ provide input signals to respective gates 42a–42d, the outputs of which are applied as one input to an OR gate 52. Each of the command terminals $C_a$–$C_d$ is connected to the Q output of a respective D-type flip-flop 46a–46d. The clock inputs of these flip-flops 46a–46d are connected to the respective outputs of NAND gates 44a–44d. The reset inputs of the flip-flops 46a–46d are connected to a node situated between a resistor 48 and a capacitor 50. The resistor 48 is connected to a power supply for the remote station 14 such that each of the flip-flops 46a–46d is reset in the event power is lost.

The three incoming terminals 30,32,34 are connected to inverting amplifiers 54,56,58 respectively, which act as line receivers. The data signal as amplified by the inverting amplifier 56 is applied to the D input of each of the flip-flops 46a–46d as well as to the other input of the OR gate 52. The clock signal as amplified by the inverting amplifier 58 is applied to one input of each of the NAND gates 44a–44d as well as to an inverting line driver 66 which is connected to the outgoing clock signal terminal 40.

The remote station 14 includes an eight-stage serial to parallel shift register 60 which includes a data input terminal that is connected to the output of the inverting amplifier 54 to receive the flag signal as transmitted by the flag conductor 16a. The clock input of the shift register 60 is connected to the output of the inverting amplifier 58 such that the shift register 60 is clocked by the clock signal which appears on the incoming clock signal terminal 34. The shift register 60 includes eight stages, each of which is associated with a respective output bit $O_1$–$O_8$. The odd output bits $O_1, O_3, O_5, O_7$ provide gating signals to the NAND gates 44a–44d, respectively, and the even output bits $O_2, O_4, O_6, O_8$ provide gating signals to the gates 42a–42d, respectively.

The output signal $O_8$ from the shift register 60 is also applied to the D input of a D-type flip-flop 68. The clocking input of this flip-flop 68 is connected to the output of the inverting amplifier 58, and the Q output of this flip-flop 68 is connected to an inverting amplifier 62, the output of which is connected to the outgoing flag signal terminal 36. Similarly, the output of the OR gate 52 is applied to the D input of a D-type flip-flop 70, and the clock input of this flip-flop 70 is also connected to the output of the inverting amplifier 58. The Q output of this flip-flop 70 is connected to an inverting amplifier 64, the output of which is connected to the outgoing data signal terminal 38.

The individual components of the remote station of FIG. 2 can be conventional integrated circuits as defined in the following table:

| Ref. No. | Description | Integrated Circuit Identifying Information |
|---|---|---|
| 42 | Tri-State Output Buffer | 74LS126A |
| 44 | NAND Gate | 74LS00 |
| 46, 68, 70 | Flip-Flop | 74LS74 |
| 48 | 100K ohm Resistor | — |
| 50 | 0.1 mfd Capacitor | — |
| 52 | OR Gate | 74LS32 |
| 54, 56, 58 | Inverter | 74LS04 |
| 60 | 8-bit Shift Register | 74LS164 |
| 62, 64, 66 | Inverter Driver | 74LS06 |

Figure 4A:
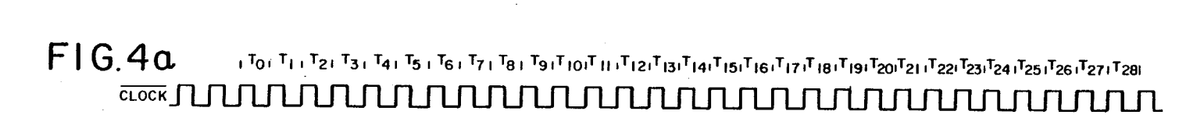
FIGS. 4a–4e are timing diagrams which illustrate the operation of the embodiment of FIG. 1.

In operation, the data transmission system 10 operates as follows. The controller 12 generates a periodic clock signal on the clock conductor 16c which is passed via the inverting amplifiers 58,66 from the ingoing clock signal terminal 34 to the outgoing clock signal terminal 40 of each of the remote stations 14. FIG. 4a shows a wave-form diagram of the clock signal, which can, for example, be a square wave signal having a frequency of two MHz. Thus, the clock signal is passed from the clock generator 22, through each of the remote stations 14 via the clock conductor 16c, back to the clock receiver 28. By monitoring the clock signal received by the clock receiver 28, the controller 12 can quickly detect any interruption of the conductor 16c or failure of the relevant components of the remote stations 14.

Figure 4B:
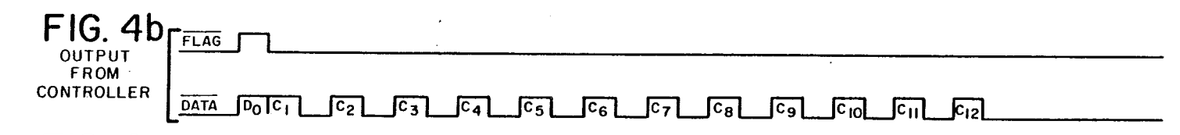

The controller 12 also generates a flag signal on the flag conductor 16b at the beginning of a communication period. FIG. 4b shows the flag signal, which is gated in synchronization with the clock signal, as it appears at the output of the controller 12. Each of the remote stations 14, upon receiving the flag signal on the flag conductor 16a, applies the inverted flag signal as an input to the shift register 60. Then, upon subsequent cycles of the clock signal on the clock conductor 16c, the inverted flag signal is moved successively through the eighth stages of the shift register 60, thereby placing each of the output bits $O_1$–$O_8$ in the logic high state for a successive respective period of the clock signal. For example, during the first clock period after the appearance of the flag signal, only the output bit $O_1$ is in the logic high state, while in the eighth period of the clock signal after the receipt of the flag signal, only the output bit $O_8$ is in the logic high state.

During the eight periods of the clock signal while the flag is being moved through the shift register 60, the shift register 60 operates to enable successive ones of the NAND gates 44a–44d and the gates 42a–42d. These eight periods of the clock signal can be thought of as defining eight separate time slots. During the first time slot, only the output $O_1$ is in the logic high state and the NAND gate 44a clocks the flip-flop 46a to store the currently prevailing logical state of the output of the inverting amplifier 56 in the flip-flop 46a. Thus the NAND gate 44a and the flip-flop 46a cooperate to gate a command signal from the data conductor 16c to the command terminal $C_a$ only when the flag signal is stored in the first stage of the shift register 60. During the second time slot, only the output signal $O_2$ is in the logic high state, and only the gate 42a gates the signal appearing on the response terminal $R_a$ to the OR gate 52, and via the flip-flop 70 and the inverting amplifier 64 to the outgoing data signal terminal 38. Thus, the gate 42a, OR gate 52, flip-flop 70 and amplifier 64 cooperate to gate a response signal from the response terminal $R_a$ to the data conductor 16b only when the flag signal is stored in the second stage of the shift register 60. In this way, the output of the inverting amplifier 56 is stored in the flip-flops 46a–46d during time slots 1, 3, 5, and 7, respectively, and the gates 42a–42d pass signals appearing on the response terminals $R_a$–$R_d$ through to the outgoing data signal terminal during time slots 2, 4, 6 and 8, respectively. The ninth period of the clock signal shifts the flag signal out of the shift register 60, thereby disabling the gates 42a–42d and the NAND gates 44a–44d until the next flag signal is stored in the shift register 60.

The output signal $O_8$ is also connected to the D input of the flip-flop 68. The flip-flop 68 supplies a Q output to the amplifier 62 which operates to place the flag signal on the outgoing flag signal terminal 36 after it has been moved to the eighth stage of the shift register 60.

Of course, non-inverting amplifiers can be substituted for the inverting amplifiers 54–58, 62–66 and the polarity of signals on the conductors 16a, 16b, 16c be inverted if desired. In this application, the terms clock signal, data signal and flag signal are intended broadly to cover the original signals and the inverted form of the signals.

FIGS. 4b–4e illustrate the timing and signal wave forms characteristic of the remote stations 14. In FIGS. 4b–4e, inverted forms of the flag and data signals have been shown. Thus, the signals appearing on the cable 16 are actually the inverse of the illustrated waveforms.

As shown in FIG. 4b, the output from the controller 12 comprises a flag signal which is synchronized in time with a first data signal $D_0$. This first data signal $D_0$ is a unique signal characteristic of the beginning of a communication period. Following the first data signal $D_0$ is an array of command signals $C_1$–$C_{12}$ in the illustration of 4b. Command signals $C_1$–$C_4$ are intended for the first remote station 14a, command signals $C_5$–$C_8$ are intended for the second remote station 14b, and command signals $C_9$–$C_{12}$ are intended for the third remote station 14c.

Figure 4C:
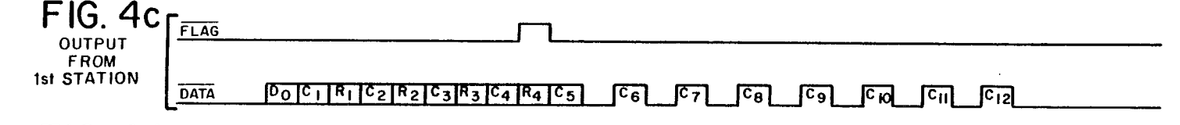

FIG. 4c shows the output from the first remote station 14a, as the signals appear at the inputs to the inverting amplifiers 62, 64. Note that the first remote station 14a has inserted response signals $R_1$–$R_4$ and has delayed the flag signal so that it is no longer coincident with the first data signal $D_0$. Rather, the shift register 60 of the first remote station 14a delays the flag signal by eight periods of the clock signal with respect to the data signals, and the flag signal is coincident with the fourth response signal $R_4$ at the outgoing flag signal terminal 36 of the first remote station 14a.

Figure 4D:
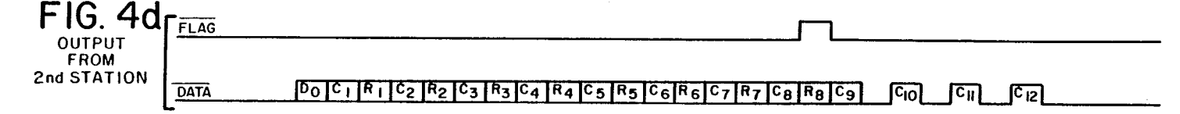

Similarly, FIG. 4d shows the inverted forms of flag and data signals as they appear at the inputs to the inverting amplifiers 62, 64 of the second remote station 14b. Note that the second remote station 14b has inserted response signal $R_5$–$R_8$ and has further delayed the flag signal to the period of the clock signal corresponding to the response signal $R_8$.

Figure 4E:
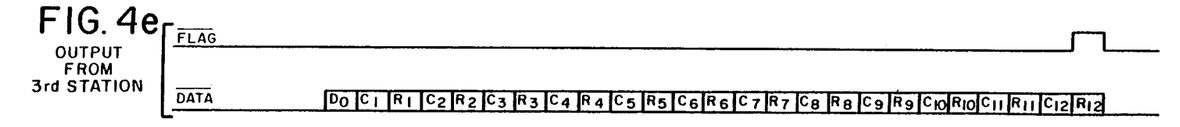

FIG. 4e shows the flag and data signals as they appear at the inputs to the inverting amplifiers 62, 64 of the third remote station 14c. As shown in FIG. 4e, the third remote station inserts the response signals $R_9$–$R_{12}$ and further delays the flag signal to the period of the clock signal corresponding to the response signal $R_{12}$. In FIGS. 4b–4e, the time slots for the command signals $C_1$–$C_{12}$ and the response signals $R_1$–$R_{12}$ have been shown as blocks. Of course, each of these signals can be in either the logic high state or the logic low state.

From this description, it should be apparent that the data transmission system 10 operates to send respective four-bit sets of command signals to each of the remote stations 14 and to transmit respective four-bit sets of response signals from the remote stations 14 to the controller 12. All of this is done without requiring separate addressing for the individual remote stations 14 and without requiring internal timers or the like in the remote stations 14 to determine signal transmission periods. Rather, it is the clock signal that defines the transmission periods for each of the remote stations 14, and it is the flag signal that enables successive ones of the remote stations 14 as the flag signal moves around the ring.

The flip-flops 68,70 ensure that the data signals generated at the outgoing data signal terminal 38 and the flag signal generated at the outgoing flag signal terminal 36 remain synchronized with the clock signal, despite propagation delays. This feature of the system 10 allows the system to operate reliably, even where propagation delays extend over a number of periods of the clock signal. In FIGS. 4b–4e, the data signals are shown as being progressively retarded as an indication of such propagation delays.

In the transmission system 10 of FIGS. 1–4e, three separate conductors are provided in the cable 16. If desired, additional power conductors can be provided to transmit power for the remote stations 14 from the controller 12. However, in many applications, the separation between remote stations 14 will make it preferable to provide separate power sources for each of the remote stations 14.

Figure 5:
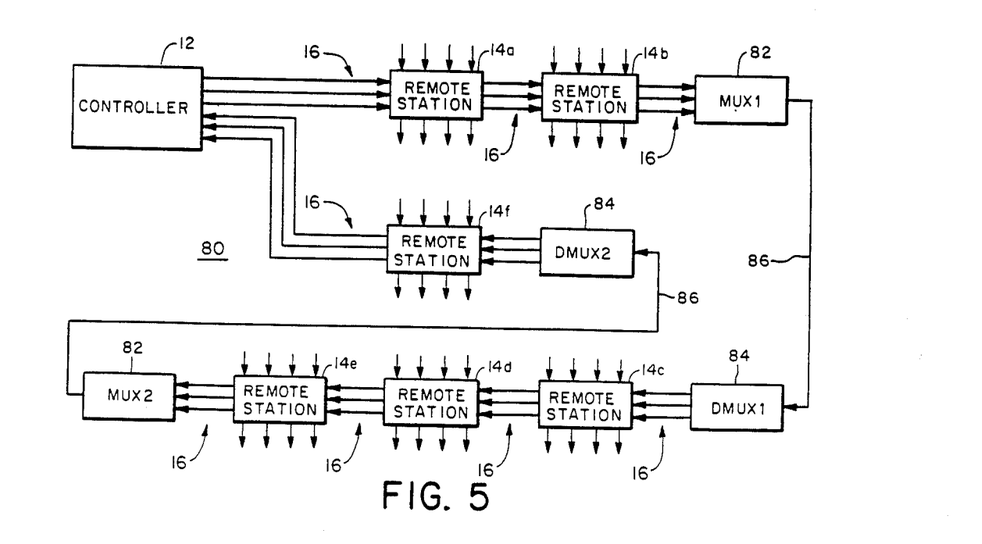
FIG. 5 is a schematic diagram of a second data transmission system which incorporates the remote station of FIG. 3.

In alternate embodiments, it is not necessary that a three-conductor cable 16 be used to interconnect each of the remote stations 14. FIG. 5 shows an alternative data transmission system 80 which utilizes the same controller 12 and the same remote stations 14a–14f as those described above. However, the embodiment of FIG. 5 utilizes a multiplexer 82 to encode the signals on the cable 16 onto a single channel fiber optic cable 86, and the signals are then transmitted to a demultiplexer 84. The demultiplexer 84 separates the signals on the single conductor cable 86 to the format described above. The multiplexers 82, demultiplexers 84, and cables 86 can be designed to utilize fiber optic transmission techniques where it is important to minimize susceptibility to electromagnetic interference or to minimize electromagnetic radiation. A variety of multiplexing techniques can be used in the design of the multiplexers 82 and the demultiplexers 84. The pulse duration multiplex system described in U.S. Pat. No. 4,345,323 is one suitable system. The specific details of the multiplexing operation do not form part of this invention, and will therefore not be described in detail here. The term "channel" is used herein in its broad sense to encompass both single signal links such as the conductors 16a, 16b and 16c and multiple signal links such as the cable 86.

In the embodiments described above, the shift register 60 is used both (1) to store the flag signal for a selected storing interval and (2) to generate gating signals during a gating interval in which the remote station is enabled to store command signals from the data conductor and to place response signals on the data conductor. In alternate embodiments these two functions can be performed by separate circuits. For example in alternate embodiments it may be preferable to allow the gating interval to start and stop at times other than the start and stop of the storing interval. For example, the gating interval may be delayed with respect to the storing interval, or the gating interval may be of shorter duration than the storing interval. Of course, the particular circuitry used to implement the function described above can readily be adapted for the particular application.

The data transmission systems described above provide a number of important advantages. The returning clock pulses and the returning initial data signal $D_0$ allow the controller 12 to determine the appropriate signal timing, even in the event of significant propagation delays. For example, if the total length of the cable 16 is one-half mile, the propagation delay may amount to about four microseconds. If a two MHz clock signal is used, this delay represents about eight clock cycles. Nevertheless, the techniques described above allow the controller 12 to function properly in the face of such propagation delays. Furthermore, the returned clock signal monitored by the controller 12 allows the controller 12 to determine immediately any interruption in the clock conductor 16c or any failure of associated components of the remote stations 14.

The progressively retarded flag signal allows extreme simplicity and economy of construction for the remote stations 14. The flag signal is a single pulse sent out by the controller at the beginning of a communication period, and the communication period ends when the flag returns to the controller. As explained above, the data signals on the data conductor 16b preferably include both commands sent from the controller 12 to the remote stations 14 and responses sent from the remote stations 14 back to the controller 12. Of course, any desired mix of commands and responses can be accommodated in alternative embodiments. As explained above, the remote stations 14 include flip-flops 68,70 which operate to synchronize the data and flag signals with the clock signal, much like a regenerative repeater. In this way, the integrity of the output wave forms is preserved. As pointed out above, the remote station of this invention is well-suited for use with fiber optic links, either between adjacent remote stations or between multiplexers and demultiplexers as described above.

Another important advantage of the preferred embodiments described above is that the transmission quality of signals is improved because there are no intermediate taps, with associated capacitances, in the cable 16. The remote stations 14 are extremely simple and inexpensive to produce, and they do not have individual addresses that must be set. The maximum number of remote stations 14 need not be limited by the particular design and it is feasible to have a large number of remote stations 14 simply by properly programming the controller 12. Since the signals are regeneratively repeated at every remote station the maximum total distance of the ring can be many times that of a single span.

It is therefore intended that the foregoing detailed description be regarded as illustrative rather than limiting, and that it be understood that it is the following claims, including all equivalents, which are intended to define the scope of this invention.

I claim:

1. A data transmission station for use in a data transmission system that comprise a clock channel adapted to carry a periodic clock signal, a flag channel adapted to carry a flag signal, and a data channel adapted to carry a plurality of data signals between the data transmission station and at least one additional station, said data transmission station comprising:
    a plurality of data terminals;
    means, responsive to the clock channel, for receiving the clock signal;
    means, responsive to the flag channel, for receiving the flag signal;
    means, responsive to the flag signal receiving means, for storing the flag signal for only a selected interval comprising a first predetermined number of clock signal periods;
    means, responsive to the clock signal and the flag signal, for gating a plurality of data signals between the data channel and the data terminals during a gating interval which starts a second predetermined number of clock signal periods after the flag signal is received by the flag signal receiving means and lasts for a third predetermined number of clock signal periods; and
    means for placing the flag signal on the flag channel after said selected interval.

2. The invention of claim 1 wherein said storing means comprises a shift register comprising a clock input coupled to received the clock signal, a signal input coupled to receive the flag signal, and a plurality of gating outputs coupled to the gating means and the placing means.

3. The invention of claim 1 wherein the data terminals comprise a plurality of command terminals and a plurality of response terminals, wherein the gating means comprises a plurality of gates, each responsive to a respective one of the gating signal outputs, and wherein the gates are connected between the data channel and the data terminals to place selected data signals from the data channel on the command terminals and to place selected data signals from the response terminals on the data channel.

4. The invention of claim 1 wherein the gating interval corresponds to the selected interval, wherein the first and third predetermined number of clock signal periods are equal, and wherein the second predetermined number of clock signal periods is equal to zero.

5. The invention of claim 1 wherein the clock, flag and data channels comprise:
    a signal link;
    multiplexer means for multiplexing the clock, flag, and data signals onto the signal link; and
    demultiplexer means for demultiplexing the clock, flag, and data signals from the signal link.

6. The invention of claim 5 wherein the signal link comprises a fiber optic cable.

7. A data transmission station comprising:
    an incoming flag signal terminal, clock signal terminal and data signal terminal adapted to receive a flag signal, a periodic clock signal, and a plurality of data signals, respectively;
    an outgoing flag signal terminal, clock signal terminal and data signal terminal;
    a plurality of data terminals;
    first means, responsive to the flag signal and the clock signal, for receiving the flag signal from the incoming flag terminal, storing the flag signal for only a selected interval defined by a predetermined number of periods of the clock signal, and then placing the flag signal on the outgoing flag signal terminal;
    second means, responsive to the first means and operative during the selected interval when the flag signal is stored by the first means, for gating data signals between at least selected ones of the data terminals and the outgoing data signal terminal during time slots defined by the clock signal;
    means for passing the clock signal from the incoming clock signal terminal to the outgoing clock signal terminal; and
    means for passing data signals from the incoming data signal terminal to the outgoing data signal terminal.

8. The invention of claim 7 wherein the first means comprises a shift register having a plurality of stages, an input terminal coupled to receive the flag signal from the incoming flag signal terminal, a clock terminal coupled to receive the clock signal from the incoming clock terminal, and a plurality of output terminals, each associated with a respective one of the stages and coupled to the gating means, and wherein the shift register generates a gating signal on successive ones of the output terminals as the clock signal causes the flag signal to be shifted through the stages of the shift register.

9. The invention of claim 7 further comprising:

third means, responsive to the first means and operative during the selected interval when the flag signal is stored by the first means, for gating data signals between the incoming data signal terminal and at least selected other ones of the data terminals during time slots defined by the clock signal.

10. The invention of claim 7 wherein the third means is operative only during the selected interval.

11. The invention of claim 9 wherein the third means is operative only during the selected interval.

12. The invention of claim 7 further comprising:
a signal link; and
a multiplexer coupled to receive the flag, clock and data signals from the outgoing flag signal terminal, outgoing clock signal terminal and outgoing data signal terminal, said multiplexer comprising means for multiplexing the flag, clock, and data signals onto the signal link.

13. The invention of claim 12 wherein the signal link comprises a fiber optic cable.

14. The invention of claim 7 further comprising:
a signal link which carries the flag, clock and data signals in a multiplexed form;
a demultiplexer interconnected between the signal link and the incoming flag, clock and data signal terminals, said demultiplexer comprising means for demultiplexing the flag, clock and data signals from the signal link and applying the respective demultiplexed signals to the incoming flag, clock and data signal terminals.

15. The invention of claim 14 wherein the signal link comprises a fiber optic cable.

16. A data transmission station comprising:
an incoming flag signal terminal, clock signal terminal and data signal terminal adapted to receive a flag signal, a periodic clock signal, and a plurality of data signals, respectively;
an outgoing flag signal terminal, clock signal terminal and data signal terminal;
a plurality of data terminals;
first means, responsive to the flag signal and the clock signal, for receiving the flag signal from the incoming flag terminal, storing the flag signal for only a selected interval defined by a predetermined number of periods of the clock signal, and then placing the flag signal on the outgoing flag signal terminal;
second means, responsive to the first means and operative during the selected interval when the flag signal is stored by the first means, for gating data signals between the incoming data signal terminal and at least selected ones of the data terminals during time slots defined by the clock signal;
means for passing the clock signal from the incoming clock signal terminal to the outgoing clock signal terminal; and
means for passing data signals from the incoming data signal terminal to the outgoing data signal terminal.

17. The invention of claim 16 wherein the first means comprises a shift register having a plurality of stages, an input terminal coupled to receive the flag signal from the incoming flag signal terminal, a clock terminal coupled to receive the clock signal from the incoming clock signal terminal, and a plurality of output terminals, each associated with a respective one of the stages and coupled to the gating means, and wherein the shift register generates a gating signal on successive ones of the output terminals as the clock signal causes the flag signal to be shifted through the stages of the shift register.

18. The invention of claim 16 wherein the second means is operative only during the selected interval.

19. The invention of claim 16 further comprising:
a signal link; and
a multiplexer coupled to receive the flag, clock and data signals from the outgoing flag signal terminal, outgoing clock signal terminal and outgoing data signal terminal, said multiplexer comprising means for multiplexing the flag, clock, and data signals onto the signal link.

20. The invention of claim 19 wherein the signal link comprises a fiber optic cable.

21. The invention of claim 16 further comprising:
a signal link which carries the flag, clock and data signals in a multiplexed form;
a demultiplexer interconnected between the signal link and the incoming flag, clock and data signal terminals, said demultiplexer comprising means for demultiplexing the flag, clock and data signals from the signal link and applying the respective demultiplexed signals to the incoming flag, clock and data signal terminals.

22. The invention of claim 21 wherein the signal link comprises a fiber optic cable.

23. A data transmission station comprising:
an incoming flag signal terminal, clock signal terminal and data signal terminal adapted to receive a flag signal, a periodic clock signal, and a plurality of data signals, respectively;
an outgoing flag signal terminal, clock signal terminal and data signal terminal;
a plurality of data terminals comprising a plurality of command terminals and a plurality of response terminals;
means for passing the clock signal from the incoming clock signal terminal to the outgoing clock signal terminal;
means for passing data signals from the incoming data signal terminal to the outgoing data terminal;
a shift register comprising a plurality of stages, an input terminal coupled to receive the flag signal from the incoming flag signal terminal, a clock terminal coupled to receive the clock signal from the incoming clock signal terminal, and a plurality of output terminals, each associated with a respective stage of the shift register, said shift register comprising means for shifting the flag signal through successive ones of the stages in synchrony with the clock signal in order to generate a gating signal on successive ones of the output terminals;
a plurality of response signal gates, each coupled between a respective one of the response terminals and the outgoing data signal terminal, and each responsive to the gating signal on a respective one of the output terminals to gate a data signal from the respective response terminal to the outgoing data signal terminal;
a plurality of command signal gates, each coupled between the incoming data signal terminal and a respective one of the command terminals, and each responsive to the gating signal on a respective one of the output terminals to gate a data signal from the incoming data signal terminal to the respective command terminal; and
means for placing the flag signal on the outgoing flag signal terminal after the flag has reached a selected stage of the shift register.

24. The invention of claim 23 wherein the data terminals comprise eight terminals, wherein the shift register comprises eight stages, and wherein the selected stage is the eighth stage.

25. The invention of claim 24 wherein the response terminals comprise four terminals, wherein the stages are numbered 1 through 8, and wherein the response signal gates are responsive to the output terminals for stages n, n+2, n+4, and n+6, where n is selected from the set consisting of 1 and 2.

26. The invention of claim 25 wherein n equals 2.

* * * * *

UNITED STATES PATENT OFFICE
CERTIFICATE OF CORRECTION

Patent No. 4,730,309            Dated March 8, 1988

Inventor(s) Paul S. Chang

It is certified that error appears in the above-identified patent and that said Letters Patent is hereby corrected as shown below:

In claim 2, column 8, line 5, after the first occurrence of "gating" add the word --signal--.

In claim 8, column 8, line 61, before the word "terminal" add the word --signal--.

In claim 10, column 9, line 7, the word "third" should be --second--.

Signed and Sealed this

Seventeenth Day of December, 1991

*Attest:*

HARRY F. MANBECK, JR.

*Attesting Officer*      *Commissioner of Patents and Trademarks*